United States Patent [19]

Bragole

[11] 3,892,885

[45] *July 1, 1975

[54] PROCESS FOR TREATING POLYMERIC SURFACES TO PROVIDE INCREASED ADHERENCE TO SUBSEQUENTLY APPLIED COATINGS

[75] Inventor: Robert A. Bragole, Danvers, Mass.

[73] Assignee: USM Corporation, Boston, Mass.

[ * ] Notice: The portion of the term of this patent subsequent to Oct. 9, 1990, has been disclaimed.

[22] Filed: Sept. 21, 1973

[21] Appl. No.: 399,560

Related U.S. Application Data

[63] Continuation-in-part of Ser. No. 201,541, Nov. 23, 1971, Pat. No. 3,764,370, which is a continuation-in-part of Ser. No. 887,348, Dec. 22, 1969, abandoned.

[52] U.S. Cl. ............ 427/54; 204/159.23; 427/302; 427/322; 427/385; 428/421; 428/425; 428/515
[51] Int. Cl.²..... B44D 1/50; B44D 5/12; C08F 3/00
[58] Field of Search ........ 117/47 A, 93.31, 138.8 E, 117/138.8 D, 138.8 N, 138.8 A, 161 KP, 161 L, 161 ZB, 161 UZ; 156/272; 204/159.15, 159.16, 159.22, 159.23

[56] References Cited

UNITED STATES PATENTS

| 2,873,241 | 2/1959 | Strzyzewski et al. | 117/93.31 |
| 3,088,791 | 5/1963 | Cline et al. | 117/93.31 |
| 3,131,138 | 4/1964 | Durup et al. | 117/47 A |
| 3,453,195 | 7/1969 | Kuhne | 117/93.31 |

FOREIGN PATENTS OR APPLICATIONS

| 856,884 | 12/1960 | United Kingdom | 117/93.31 |

*Primary Examiner*—J. H. Newsome
*Attorney, Agent, or Firm*—Benjamin C. Pollard; Vincent A. White; Richard B. Megley

[57] ABSTRACT

The process of coating a polymer resin including the steps of cross linking the surface of the resin and generating "living" radicals at the surface of the resin by ultraviolet light radiation and thereafter applying a polymeric resin coating composition including groups which will combine with the surface through the action of the "living" radicals.

10 Claims, No Drawings

PROCESS FOR TREATING POLYMERIC SURFACES TO PROVIDE INCREASED ADHERENCE TO SUBSEQUENTLY APPLIED COATINGS

This is a continuation-in-part application of application Ser. No. 201,541, filed Nov. 23, 1971 now U.S. Pat. No. 3,764,370 entitled "Process for Coating Polymeric Surfaces" which issued Oct. 9, 1973, that patent being a continuation-in-part of application Ser. No. 887,348, filed Dec. 22, 1969, now abandoned.

FIELD OF THE INVENTION

This invention relates to a process for coating resin surfaces particularly of olefin polymer resins.

BACKGROUND OF THE INVENTION

Processes heretofore proposed for coating of resins such as polyethylene, to which paints and lacquers do not normally adhere well, have employed treatments effective to improve the wettability of the surface and/or generate chemically reactive groups, generally hydroxyl groups at the resin surface for chemical reaction with reactive groups such as isocyanate or epoxide. Increase in wettability alone allows the formation of coatings which are satisfactory for some purposes; but quite generally, the treatment that gives increase in wettability, generates at the same time a weak boundary layer which limits the ultimate strength of union between the coating and the resin surface. Coatings in which there is a chemical reaction between reactive groups at the resin surface and reactive groups in the coating often adhere quite strongly; but the requirement of the presence of chemically reactive groups such as isocyanate or epoxide excludes from use many of the coating compositions such as acrylic and methacrylic lacquers which are easier of application and provide coatings having properties which are outstanding for many purposes.

SUMMARY OF THE INVENTION

It is an object of the present invention to provide a coating process for forming a strongly adherent coating with compositions which do not require chemically reactive groups for establishing a strong bond to the resin surface.

To this end and in accordance with a feature of the present invention, the resin surface to be coated is treated to generate at the resin surface an integral cross-linked, strong bonding layer having a low angle of wetting and to provide a concentration of "living" or "free radicals" and the treated surface is coated with a polymeric resin composition which includes groups which will interact with the resin surfaces in which the free radicals were generated.

DESCRIPTION OF THE PREFERRED EMBODIMENTS

Applicant has discovered that ultraviolet radiation of a resin surface carrying a ketone or multi-ring hydrocarbon photosensitizer effects a profound and permanent alteration of the resin surface which remains even after wiping or solvent treatment and will join strongly to coatings such as paints and lacquers applied to it.

More particularly, it appears that radiation in the presence of the selected photosensitizer produces a cross-linked surface layer which is integral with the main body of resin so that there is a strong tough layer in contrast to surface generation of halogen compounds constituting a weak boundary layer through ultraviolet radiation of resins in the presence of halogen compounds. Moreover, as part of the action of ultraviolet radiation with ketone or multi-ring hydrocarbon photosensitizer there is generated a surface layer having a lower angle of wetting and a concentration of living radicals effective to give outstanding adhesion and resistance to separative action, for example, on soaking in water.

Materials which are treated according to the process of the present invention are low surface tension of wetting substrates which because of this characteristic are difficult to wet and bond with adhesives. Materials considered as having low surface energy are those of which the critical surface tension of wetting is 35 dynes per centimeter or less as determined by contact angle measurements. (See Page 20 of "Contact Angle, Wettability and Adhesives," No. 43 of the "Advances in Chemistry Series," published 1964 by the American Chemical Society.) Included in the category are polyethylene, polypropylene, copolymers of ethylene and propylene alone or with a very low percentage of a non-conjugated diene, e.g. the commercial terpolymer EPDM comprising about 64% ethylene, about 34% propylene and about 2% 1,4-hexadiene, copolymers of ethylene or propylene with other monomers such as vinyl acetate or ethyl acrylate and fluorine-containing polymers such as polyvinyl fluoride and polyvinylidene fluoride. Polymers for treatment by the present process must have at least some hydrogen on a carbon chain in a repeating unit in the polymer chain.

It has also been found that bodies of other resins which, because of surface contamination by mold release or demolding agents or other surface action occuring in the course of molding, are difficult to coat uniformly, may be coated with strongly adherent coats by following the process of the present invention. Included in such resin materials are resins which theoretically are easy to coat but are difficult to coat in practice, including the commercially available acetal resin materials known as Celcon and Delrin, high molecular weight polyamides such as nylon (Zytel) and polycaprolactam (Vykan-A), polyurethanes and ionomer resin materials such as the material available as Surlyn-A which is understood to be a metallic salt of an acrylic acid copolymer.

In every case, the resin surface to be coated must have at least some hydrogen on a carbon chain in a repeating unit in the polymer chain.

The first step in the process is the treatment of the surface of the polymer resin material by ultraviolet radiation in the presence of a ketone or multiple hydrocarbon ring photosensitizer. The ultraviolet radiation bombards the surface of the polymer resin with photons which excite the molecules and cause chemical and electronic changes in the surface molecules. The presence of the ultraviolet radiation photosensitizer at the polymer resin surface increases the effectiveness of the radiation and, in excited state, the photosensitizer interacts with the resin substrate both to increase the cross linking action of the radiation and to develop living or free radicals in the polymer resin molecules at the surface of the body being radiated. It appears to be important that photosensitizers have a triplet state energy of at least about 62 K cal/mole. Preferred photosensitizers are ketone materials such as benzophenone, acetophenone, benzoin, 2-acetonapahthone, hydrocarbon multiple ring compounds such as acenaphthene and fluorene. Halogenated hydrocarbons such as methylene chloride, trichlorethylene and chloroform have some effect in generating free radicals but produce a chlorination rather than a cross linking action at the surface of the irradiated polymer resin, and, in contrast with the ketone type of photosensitizers, give a marked change in the surface tension of wetting and in the hydrophilic character of the surface of the polymer resin body so that wettability is increased and resistance to water of an applied coating is decreased. Because the halogenated hydrocarbon photosensitizers do not have the strong cross linking action of the preferred group of photosensitizers, the radiated bodies may retain a weak boundary layer which limits the strength of union between an applied coating and the treated surface.

The following equations illustrate the cross linking and living radical generation action of ultraviolet radiation.

(1)

Equation one shows that when subjected to ultraviolet radiation, benzophenone is excited from the ground state to the first excited singlet state and then to the first excited triplet state.

(2)

Equation two shows that the benzophenone in the triplet state acts on a surface molecule of, for example, a polyolefin resin body indicated as RH to abstract hydrogen from the polyolefin leaving the remainder of the polyolefin as a free or living radical while converting the benzophenone to a hydroxyl bearing free radical.

At this point two types of free radical induced reaction occur. As shown in equation three, where it is sterically possible, adjacent polyolefin free radicals may combine with each other to give a cross linking effect.

(3)

$$R\cdot + R\cdot \rightarrow R-R$$

Another cross linking mechanism is shown in the following equation:

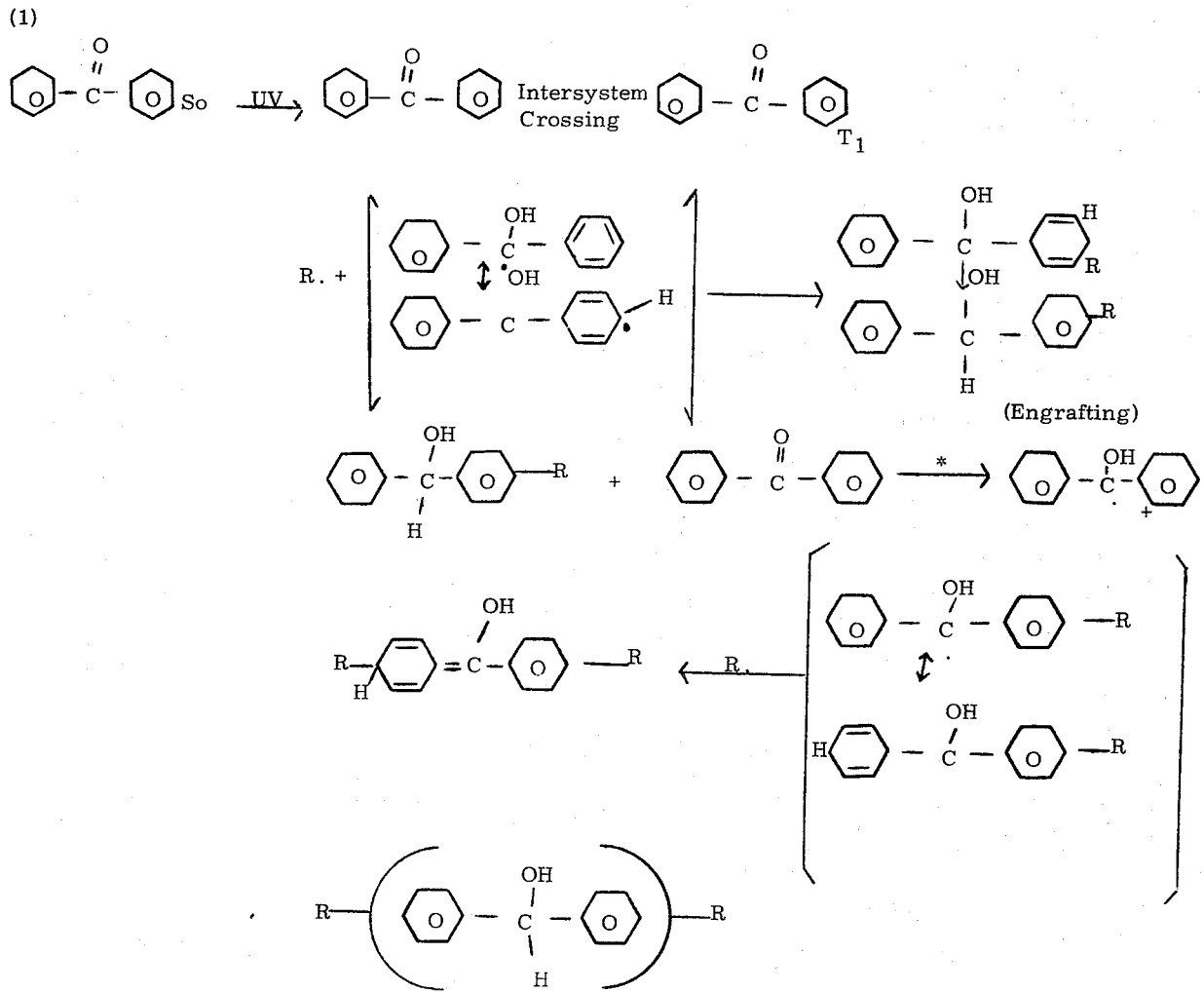

*Cross-linked product with photoreduced benzophenone bridge

When coatings of resin polymers containing unsaturated compounds, particularly coatings including small percentages of monomers with vinyl or vinylidene groups such, for example, as methylmethacrylate, are applied to the irradiated surface, the free radicals may react with such compounds to engraft them and transfer the radical activity to the added on unit which in turn can react with a further compound.

It has also been found that with many polymers such as polystyrene and the polymers and copolymers of the lower alkyl esters of acrylic and methacrylic acid, e.g. polymethylacrylate or polymethylmethacrylate, a free radical can transfer its activity to the polymer so that, for example, the polymer becomes a free radical which is capable of interaction with other free radicals or other polymerizable material to effect a coupling of two radical species.

It will be seen from the above discussion that this ultraviolet radiation in the presence of ketone and multiring hydrocarbon photosensitizers not only cross link the surface of the polymer resin body to eliminate weak boundaries but also generates free radicals in the surface molecules of the resin body and these radicals produce an engrafting of both monomer and polymer components of the coating material applied to the irradiated surface to give a strong union between the coating material and the polymer resin surface.

The ultraviolet radiation for achieving the above discussed action has been found most effective at a wave length of from 2,000 A to 3,500 A and more preferably from 2,000 A to 2,800 A. The degree of cross linking or radical generation is dose dependent. The surface concentration or prevalency of free or living radicals desired for improving the union of the coating material to the surface of the polymer resin body will vary with the reactivity of the coating material. That is, coating materials containing less reactivity, either because of less reactive monomeric or polymeric material or lower concentrations of monomeric material, will require a higher concentration of free radicals at the surface because the overall rate of reaction which is the product of the concentration of radicals in the surface of the polymer resin and the concentration of reactive groups of the coating would be less. It appears that at least about 1,000 watt seconds per square foot of radiation is needed and that with less reactive coating materials substantially higher dosages may be required.

As an example, commercial acrylic lacquers may contain small quantities of not over about 0.1 percent of monomer, e.g. methylmethacrylate, methacrylic acid, acrylic acid, etc., which because of their unsaturation would react easily with free radicals at the surface of the polymer resin. where all monomer has been stripped from the polymeric base of the coating so that the coating was free of monomers containing vinyl or other olefinic unsaturation, additives such as acrylic acid or other reactive agents may be incorporated in such coatings and will be available for free radical addition engrafting on a polymer resin surface containing free radicals. As little as 0.05 percent by weight based on the weight of the film-forming component of the paint of a monomer havng a vinyl or vinylidene radical is effective markedly to reduce the dosage of radiation needed to give a strongly adherent Higher percentages, preferably from about 0.1 percent to about 1.0 percent by weight based on the weight of the polymeric film former may be used but excess residual monomer in the final coating is unacceptable because of bleeding to the surface, odor and other problems so that the coating composition should not contain over about 5 percent of such monomer.

On the other hand, polyurethane and epoxy coatings and paints derived from materials having substantially no olefinic unsaturation and having very little or no residual —NCO or epoxy functionality have less reactivity and will require a higher concentration of free radicals at the polymer resin surface to achieve strong union within a practical time.

The photosensitizer is generally applied to the surface of the material in the form of a solution in a volatile solvent in the case of solid photosensitizers or as a pure or diluted liquid in the case of liquid photosensitizers. As little as 2 percent by weight of photosensitizer in the solution applied may be effective; but higher percentages may be used without adverse results. The important factor is presence of the photosensitizer at the surface during ultraviolet radiation and this may be secured by melting and spraying fusible solid photosensitizer on the surface or by other procedures such as dusting on a powder of the photosensitizer.

It has even found that photosensitizers, preferably solid photosensitizers of the ketone type, may be uniformly distributed through the material to be bonded as by milling the photosensitizer into the material. Apparently, sufficient of the photosensitizer reaches the surface by migration or otherwise to provide sensitizing action. To be effective in this relation there should be used at least about 0.1 percent by weight of the compound.

It has been observed with solid photosensitizers that their effectiveness is increased where heat sufficient to fuse the photosensitizer is applied. This may be the heat generated in the course of ultraviolet radiation. Because of this factor, it is desirable to use lower melting point photosensitizers to facilitate wetting of the substrate by the photosensitizer. Of course, mixtures of photosensitizers including, for example, high and low melting point photosensitizers or components which reduce the melting point of the photosensitizer may be used.

Where the surface being treated is an elastomeric material, fusion of the photosensitizer appears to cause the photosensitizer to penetrate into the body of material, and thus avoid presence of excess photosensitizer at the surface which might constitute a weak boundary layer.

There are also indications that the application of heat after the application of coatings to irradiated surfaces is of advantage. This heat, which may be of the time and temperature used in "curing" lacquers, for example, as little as fifteen minutes at temperatures as low as 155°F., is believed to improve the interaction of the radiation induced living radical activity of the substrate surface to enable the extremely low percentages of polymerizable monomeric material to unite the entire coating to the substrate.

An important property of the surface prepared for coating by ultraviolet radiation is that the ability to hold coatings strongly is not destroyed by dry or solvent wiping of the surface as might be desirable to remove dust, or other contaminant such as excess photosensitizer from the surface. This is a distinct advantage over surfaces treated by other means, such as flame, to prepare them for coating.

The following examples are given to aid in understanding the invention and it is to be understood that the invention is not restricted to the procedures, materials or conditions employed in the examples.

EXAMPLE 1

Polyethylene plaques were brushed with a 2% solution of benzophenone in methyl ethyl ketone, dried and subjected to ultraviolet radiation for the dosage listed in the following table. Each of the plaques was coated with a polymethylmethacrylate coating (Inmont). In one of the examples 1/10 gram of a 70 percent solution of acrylic acid in methyl ethyl ketone was added to ten grams of the polymethylmethacrylate paint. The painted surfaces were cured for 20 minutes at 155°F. to 160°F. and subjected to the cross hatch paint adhesion test. It is to be noted that while a radiation dosage of 3,430 watt seconds per square foot provided sufficient active free radicals at the radiated surface for combination with engraftable groups in the polymethylmethacrylate paint, a radiation of only 1,960 watt seconds per square foot was not sufficient to provide the necessary number of free radicals as shown by the 50 percent paint failure in experiment number 2. The provision of acylic acid by inclusion of a 70 percent solution of acrylic acid in methyl ethyl ketone in the paint provides sufficient groups which cooperate with the free radicals at the irradiated surface to provide 0 percent paint failure.

EXAMPLE 2

Polyethylene plaques were brushed with a 2% solution of benzophenone in methyl ethyl ketone, dried and subjected to ultraviolet radiation for the dosages listed in the following table. A polymethylmethacrylate primer, substantially free from monomer, was applied to the radiated surfaces, with the primer in its normal form and with additions of methacrylic acid monomer as listed in the table. The coated surfaces were cured for 15 minutes at 180°F. and subjected to the cross hatch paint adhesion test. It is to be noted that the addition of the methacrylic acid monomer remarkably reduced the amount of radiation required to secure firm adhesion of the primer.

TABLE 2

| Exp. No. | Substrate | Watt-Sec/ Sq. Ft. Rad. Dosage | Paint | % Acrylic Monomer | % Paint Failure |
| --- | --- | --- | --- | --- | --- |
| 1 | high-density polyethylene | 320 | Acrylic | 0 | 100 |
| 2 | high-density polyethylene | 800 | Acrylic | 0 | 85 |
| 3 | high-density polyethylene | 1600 | Acrylic | 0 | 50 |
| 4 | high-density polyethylene | 2400 | Acrylic | 0 | 10 |
| 5 | high-density polyethylene | 3200 | Acrylic | 0 | 0 |
| 6 | high-density polyethylene | 320 | Acrylic | 0.05 | 100 |
| 7 | high-density polyethylene | 800 | Acrylic | 0.05 | 85 |
| 8 | high-density polyethylene | 1600 | Acrylic | 0.05 | 15 |
| 9 | high-density polyethylene | 2400 | Acrylic | 0.05 | 0 |
| 10 | high-density polyethylene | 3200 | Acrylic | 0.05 | 0 |
| 11 | high-density polyethylene | 320 | Acrylic | 0.10 | 100 |
| 12 | high-density polyethylene | 800 | Acrylic | 0.10 | 85 |
| 13 | high-density polyethylene | 1600 | Acrylic | 0.10 | 0 |
| 14 | high-density polyethylene | 2400 | Acrylic | 0.10 | 0 |
| 15 | high-density polyethylene | 3200 | Acrylic | 0.10 | 0 |

EXAMPLE 3

Polyethylene plaques were brushed with a 2% solution of benzophenone in methyl ethyl ketone, dried and subjected to ultraviolet radiation for the dosages listed in the following table. A fully saturated polyurethane paint was applied in its normal form and with additions of methacrylic acid monomer as listed in the table. The coated surfaces were cured for 15 minutes at 180°F. and subjected to the cross hatch paint adhesion test. It is to be noted that the addition of the methacrylic acid monomer remarkably reduced the amount of radiation required to secure firm adhesion of the fully saturated polyurethane paint.

TABLE 1

| Exp. No. | Substrate | (Watt-Sec/ Sq. Ft.) Rad. Dosage | Add'nl. Surface Prep. | Paint | % Paint Failure |
| --- | --- | --- | --- | --- | --- |
| 1 | Polyethylene | 3430 | None | Polymethylmethacrylate (Inmont) | 0 |
| 2 | Polyethylene | 1960 | None | Polymethylmethacrylate (Inmont) | 50 |
| 3 | Polyethylene | 1960 | None | (A) Polymethylmethacrylate with Acrylic Acid | 0 |

Samples 1–3 were cured 20 min. at 155°F.–160°F.

(A) Made by dissolving 0.1 gram of 70% acrylic acid in MEK into 10 grams of the polymethylmethacrylate paint (Inmont).

TABLE 3

| Exp. No. | Substrate | Watt-Sec/ Sq. Feet Rad. Dosage | Paint | % Acrylic Monomer | % Paint Failure |
| --- | --- | --- | --- | --- | --- |
| 1 | High density polyethylene | 32 | Polyurethane | 0 | 100 |
| 2 | High density polyethylene | 80 | Polyurethane | 0 | 100 |
| 3 | High density polyethylene | 1600 | Polyurethane | 0 | 100 |
| 4 | High density polyethylene | 2400 | Polyurethane | 0 | 60 |
| 5 | High density polyethylene | 3200 | Polyurethane | 0 | 10 |
| 6 | High density polyethylene | 6400 | Polyurethane | 0 | 5 |
| 7 | High density polyethylene | 12800 | Polyurethane | 0 | 0 |

TABLE 3—Continued

| Exp. No. | Substrate | Watt-Sec/ Sq. Feet Rad. Dosage | Paint | % Acrylic Monomer | % Paint Failure |
|---|---|---|---|---|---|
| 8 | High density polyethylene | 32 | Polyurethane | 0.05 | 100 |
| 9 | High density polyethylene | 80 | Polyurethane | 0.05 | 100 |
| 10 | High density polyethylene | 1600 | Polyurethane | 0.05 | 100 |
| 11 | High density polyethylene | 2400 | Polyurethane | 0.05 | 60 |
| 12 | High density polyethylene | 3200 | Polyurethane | 0.05 | 10 |
| 13 | High density polyethylene | 6400 | Polyurethane | 0.05 | 0 |
| 14 | High density polyethylene | 12800 | Polyurethane | 0.05 | 0 |
| 15 | High density polyethylene | 32 | Polyurethane | 0.10 | 100 |
| 16 | High density polyethylene | 80 | Polyurethane | 0.10 | 100 |
| 17 | High density polyethylene | 1600 | Polyurethane | 0.10 | 85 |
| 18 | High density polyethylene | 2400 | Polyurethane | 0.10 | 50 |
| 19 | High density polyethylene | 3200 | Polyurethane | 0.10 | 5 |
| 20 | High density polyethylene | 6400 | Polyurethane | 0.10 | 0 |
| 21 | High density polyethylene | 12800 | Polyurethane | 0.10 | 0 |

Having thus described my invention and what I claim as new and desired to secure as Letters Patent of the United States is:

1. The process of providing a distinct resinous coating strongly adherent to the surface of a body of a polymer resin having at least some hydrogen on a carbon chain in a repeating unit in the polymeric chain and having a critical surface tension of wetting of not more than 35 dynes per centimeter, said surfaces being selected from the group consisting of surfaces of bodies of resinous polyvinyl fluoride, polyvinylidene fluoride, polyolefins, copolymers of ethylene or propylene with vinyl acetate or ethyl acrylate, copolymers of ethylene and propylene containing a small proportion of a nonconjugated diene and molded surfaces of bodies of resins from the group consisting of polyacetal resins, polyamide resins, polycaprolactam resins, polyurethane resins, and ionomer resins, said process comprising the steps of providing a photosensitizer having a triplet state energy of at least about 62 K cal/mole at the surface to be coated of said polymeric material, irradiating said surface with ultraviolet light in the range of about 2,000 A to about 3,500 A to the extent of at least about 1,000 watt seconds to form a cross-linked surface integral with the body of resin and concurrently to generate free radicals in surface molecules of said polymeric material, thereafter applying to said surface a film forming synthetic polymer resin base coating composition, said composition containing from about 0.05 to about 5 percent by weight of polymerizable unsaturated monomer based on the weight of said film forming polymer resin which will combine with the surface through the action of said free radicals and subjecting said coating to heat after application to improve the interaction between said free radicals, the polymeric resin of the coating and said polymerizable unsaturated monomer material in the applied coating to unite the entire coating to said surface.

2. The process of coating a polymer resin as defined in claim 1 in which said photosensitizer is a member of the group consisting of ketone photosensitizers and hydrocarbon multiple ring compound photosensitizers.

3. The process of coating a polymer resin as defined in claim 2 in which said radiation provides at least 1,000 watt seconds radiation at a wave length of from about 2,000 A to about 2,800 A at the surface of said resin and in which the polyolefin is a member of the group consisting of polyethylene, polypropylene and copolymers of ethylene and propylene.

4. The process of coating a polymer resin as defined in claim 3 in which said polymerizable monomer includes a vinyl or vinylidene radical.

5. The process of coating a polymer resin as defined in claim 4 in which said coating composition comprises a member of the group consisting of polymers and copolymers of lower alkyl esters of acrylic acid and methacrylic acid and said monomer is present to the extent of from about 0.1 to about 1.0 percent by weight based on the weight of the film-forming polymer or copolymer.

6. The process of coating a polymer resin as defined in claim 5 in which the coated surface is subjected to a heat curing step at a temperature of at least about 155°F.

7. The process of coating a polymer resin as defined in claim 3 in which said coating composition is a polyurethane paint.

8. The process of coating a polymer resin as defined in claim 7 in which said coating composition is a heat-curable paint comprising a mixture of an hydroxyl terminated isocyanate-reacted alkyd and a melamine formaldehyde curing agent and in which said monomer is present to the extent of from about 0.1 to about 1.0 percent by weight based on the weight of the polyurethane.

9. The process of coating a polymer resin as defined in claim 8 in which the coated surface is subjected to a heat curing step at a temperature of at least about 155°F.

10. The process of coating a polymer resin as defined in claim 3 in which said coating composition is a pigmented substantially opaque paint.

* * * * *

UNITED STATES PATENT OFFICE
CERTIFICATE OF CORRECTION

Patent No. 3,892,885                    Dated July 1, 1975

Inventor(s) Robert A. Bragole

It is certified that error appears in the above-identified patent and that said Letters Patent are hereby corrected as shown below:

Column 9, line 41, after "watt seconds" insert
--per square foot--

Column 10, line 20, after "watt seconds" insert
--per square foot--

Signed and Sealed this

Thirty-first Day of August 1976

[SEAL]

Attest:

RUTH C. MASON
Attesting Officer

C. MARSHALL DANN
Commissioner of Patents and Trademarks